(12) United States Patent
Freiheit

(10) Patent No.: US 11,720,125 B2
(45) Date of Patent: *Aug. 8, 2023

(54) ELECTRIC AIRCRAFT WITH FLIGHT TRAJECTORY

(71) Applicant: BETA AIR, LLC, South Burlington, VT (US)

(72) Inventor: Collin Freiheit, Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/877,763

(22) Filed: Jul. 29, 2022

(65) Prior Publication Data

US 2023/0004175 A1  Jan. 5, 2023

Related U.S. Application Data

(63) Continuation of application No. 17/365,206, filed on Jul. 1, 2021, now Pat. No. 11,449,078.

(51) Int. Cl.
| | |
|---|---|
| *G05D 1/10* | (2006.01) |
| *B64C 29/00* | (2006.01) |
| *G08G 5/00* | (2006.01) |
| *G01W 1/04* | (2006.01) |
| *B64D 27/24* | (2006.01) |

(52) U.S. Cl.
CPC .......... *G05D 1/1062* (2019.05); *B64C 29/00* (2013.01); *B64D 27/24* (2013.01); *G01W 1/04* (2013.01); *G08G 5/0034* (2013.01)

(58) Field of Classification Search
CPC ...... G05D 1/1062; B64C 29/00; B64D 27/24; G01W 1/04; G08G 5/0034; G08G 5/0091; G08G 5/0069; G08G 5/0013; G08G 5/0021; G08G 5/0065; G08G 5/025

See application file for complete search history.

(56) References Cited

U.S. PATENT DOCUMENTS

| 8,565,938 | B2* | 10/2013 | Coulmeau | G05D 1/0005 |
| | | | | 701/120 |
| 9,208,457 | B2* | 12/2015 | Agrawal | G08G 5/0034 |
| 9,959,771 | B1* | 5/2018 | Carlson | G08G 5/0039 |
| 2019/0340933 | A1* | 11/2019 | Villa | B64C 29/0016 |
| 2019/0340934 | A1* | 11/2019 | Villa | G01C 21/20 |
| 2020/0290742 | A1* | 9/2020 | Kumar | B64D 27/24 |
| 2021/0089055 | A1* | 3/2021 | Tran | B64U 50/13 |

* cited by examiner

*Primary Examiner* — Donald J Wallace
*Assistant Examiner* — Jalal C Coduroglu
(74) *Attorney, Agent, or Firm* — Caldwell Intellectual Property Law

(57) ABSTRACT

An electric aircraft with flight trajectory planning. The electric aircraft includes a sensor. The sensor is coupled to the electric aircraft. The sensor is configured to detect a plurality of weather measurements. The electric aircraft includes a processor. The processor is communicatively connected to the sensor. The processor is configured to receive, from the sensor, a weather measurement of the plurality of weather measurements. The processor is configured to receive, from a user, a destination datum and a desired altitude datum. The processor is configured to determine an optimal trajectory of the electric aircraft as a function of the destination datum, weather datum, and altitude datum.

20 Claims, 7 Drawing Sheets

ELECTRIC AIRCRAFT WITH FLIGHT TRAJECTORY

CROSS-REFERENCE TO RELATED APPLICATIONS

This application is a continuation of Non-provisional application Ser. No. 17/365,206 filed on Jul. 1, 2021 and entitled "Electric aircraft with flight trajectory," the entirety of which is incorporated herein by reference.

FIELD OF THE INVENTION

The present invention generally relates to the field of electric aircraft. In particular, the present invention is directed to an electric aircraft with flight trajectory planning.

BACKGROUND

Modern electric aircraft, such as vertical landing and takeoff aircraft (eVTOL) may have a flight plan according to a variety of factors such as destination, altitude, weather, and fuel. These factors need to be accounted for in order to determine an optimal trajectory path for an electric aircraft.

SUMMARY OF THE DISCLOSURE

In an aspect, an electric aircraft with flight trajectory planning includes a sensor coupled to the electric aircraft, wherein the sensor is configured to detect a plurality of weather measurements, and processor communicatively connected to the sensor, wherein the processor is configured to receive, from the sensor, a weather measurement of the plurality of weather measurements, receive, from a user, a destination datum, and determine an optimal trajectory of the electric aircraft as a function of the destination datum and weather datum.

In another aspect, a method for flight trajectory planning of an electric aircraft includes detecting, using a sensor coupled to an electric aircraft, a plurality of weather measurements, receiving by a processor communicatively connected to the sensor, a weather measurement of the plurality of weather measurements, receiving, by the processor and from a user, a destination datum, and determining an optimal trajectory of the electric aircraft as a function of the destination datum, and weather datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
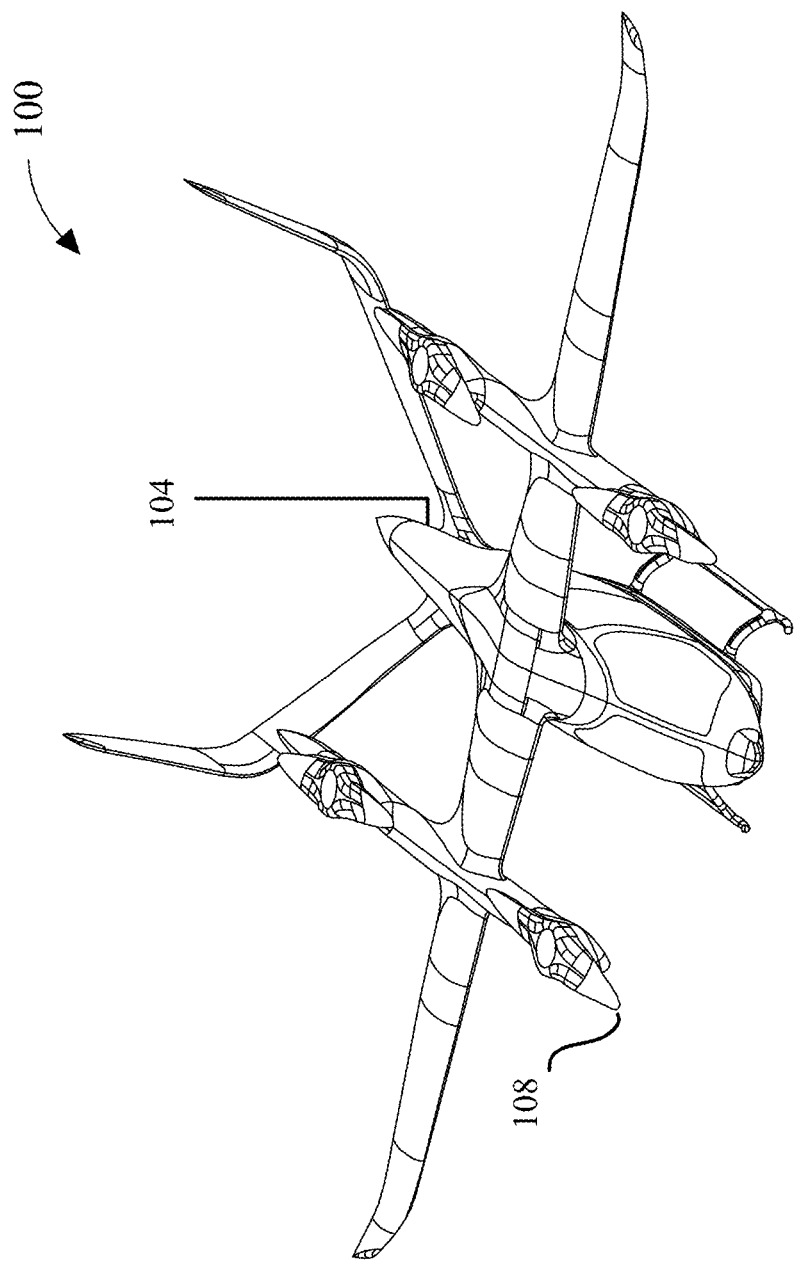
FIG. 1 is a front view of an exemplary embodiment of an electric aircraft.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is an electric aircraft with flight trajectory planning. The electric aircraft may include a sensor. The sensor may be coupled to the electric aircraft. The sensor may be configured to detect a plurality of weather measurements. The electric aircraft may include a processor. The processor may be communicatively connected to the sensor. The processor may be configured to receive from the sensor a weather measurement of the plurality of weather measurements. The processor may be configured to receive, from a user, a destination datum and a desired altitude datum. The processor may be configured to determine an optimal trajectory of the electric aircraft as a function of the destination datum, weather datum, and altitude datum. In some embodiments, the electric aircraft may include an eVTOL. In some embodiments, the destination datum may include geographical data. In some embodiments, the destination datum may include a location input from a user. In some embodiments, the weather datum may include wind speed data. In some embodiments, the weather datum may include precipitation data. In some embodiments, the altitude datum may include cruising altitude data. The electric aircraft of claim 1, wherein the electric aircraft is an eVTOL. In some embodiments, the processor may determine an optimal trajectory of the electric aircraft based on a health datum of the electric aircraft. In some embodiments, the processor may determine an optimal trajectory of the electric aircraft as a function of a set of aerodynamics and a propulsion system of the electric aircraft. In some embodiments, the processor may determine an optimal trajectory of the electric aircraft based on a fuel efficiency of the electric aircraft.

Described herein is a method for flight trajectory planning of an electric aircraft. The method may include selecting an electric aircraft. The electric aircraft may include flight trajectory planning. The electric aircraft may include a sensor. The sensor may be coupled to the electric aircraft. The sensor may be configured to detect a plurality of weather measurements. The electric aircraft may include a processor. The processor may be communicatively connected to the sensor. The method may include receiving, from the sensor, a weather measurement of the plurality of weather measurements. The method may include receiving, from a user, a destination datum and a desired altitude datum. The method may include determining an optimal trajectory of the electric aircraft as a function of the destination datum, weather datum, and altitude datum. In some embodiments, the destination datum may include geographical data. In some embodiments, the destination datum may include a location input from a user. In some embodiments, determining an optimal trajectory of the electric aircraft may be based on a health datum of the electric aircraft. In some embodiments, determining an optimal trajectory of the electric aircraft may include a function of a set of aerodynamics and a propulsion system of the electric aircraft. In some embodiments, determining an optimal trajectory may include an optimization problem. In some embodiments, determining an optimal trajectory may include a minimization problem. In some embodiments, determining an optimal trajectory mat include a maximization problem. In some embodiments, the weather datum may include wind speed data. In some embodiments, the weather datum may include precipitation data.

Referring now to FIG. 1, an illustration of an exemplary embodiment of an electric aircraft 100 is shown. Electric aircraft 100 may include a vertical takeoff and landing aircraft (eVTOL). As used herein, a vertical take-off and landing (eVTOL) aircraft is an electrically powered aircraft that can take off and land vertically; eVTOL aircraft may be capable of hovering. In order without limitation to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight.

With continued reference to FIG. 1, a number of aerodynamic forces may act upon electric aircraft 100 during flight. Forces acting on an electric aircraft 100 during flight may include, without limitation, thrust, a forward force produced by a propulsor of electric aircraft 100, which may act parallel to a longitudinal axis of the aircraft. Another force acting upon electric aircraft 100 may include, without limitation, drag, defined as a rearward retarding force which is caused by disruption of airflow by any protruding surface of electric aircraft 100 such as, without limitation, a wing, rotor, and/or fuselage. Drag may oppose thrust and act rearward parallel to relative wind. A further force acting upon electric aircraft 100 may include, without limitation, weight, which may include a combined load of the electric aircraft 100 itself, crew, baggage, and/or fuel. Weight may pull electric aircraft 100 downward due to the force of gravity. An additional force acting on electric aircraft 100 may include, without limitation, lift, which may act to oppose the downward force of weight and may be produced by a dynamic effect of air acting on an airfoil and/or downward thrust from a propulsor of the electric aircraft. Lift generated by an airfoil may depend on speed of airflow, density of air, total area of the airfoil and/or a segment thereof, and/or an angle of attack between air and the airfoil. In a non-limiting example, electric aircraft 100 may be designed to be as lightweight as possible. Reducing weight of an aircraft and designing to reduce a number of components may optimize weight. To save energy, it may be useful to reduce weight of components of an electric aircraft 100, including without limitation propulsors and/or propulsion assemblies.

Referring still to FIG. 1, electric aircraft 100 may include at least a vertical propulsor 104 and at least a forward propulsor 108. At least a forward propulsor 108 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, take-off, and/or landing, and/or may propel the aircraft forward or backward on the ground. At least a vertical propulsor 104 and at least a forward propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 1, a "vertical propulsor" as used in this disclosure is a propulsor that propels an aircraft in an upward direction; one or more vertical propulsors may be mounted on the front, on the wings, at the rear, and/or any suitable location. A "propulsor," as used in this disclosure, is a component or device used to propel a craft by exerting force on a fluid medium, which may include a gaseous medium such as air or a liquid medium such as water. At least a vertical propulsor 104 may generate a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

Figure 2:
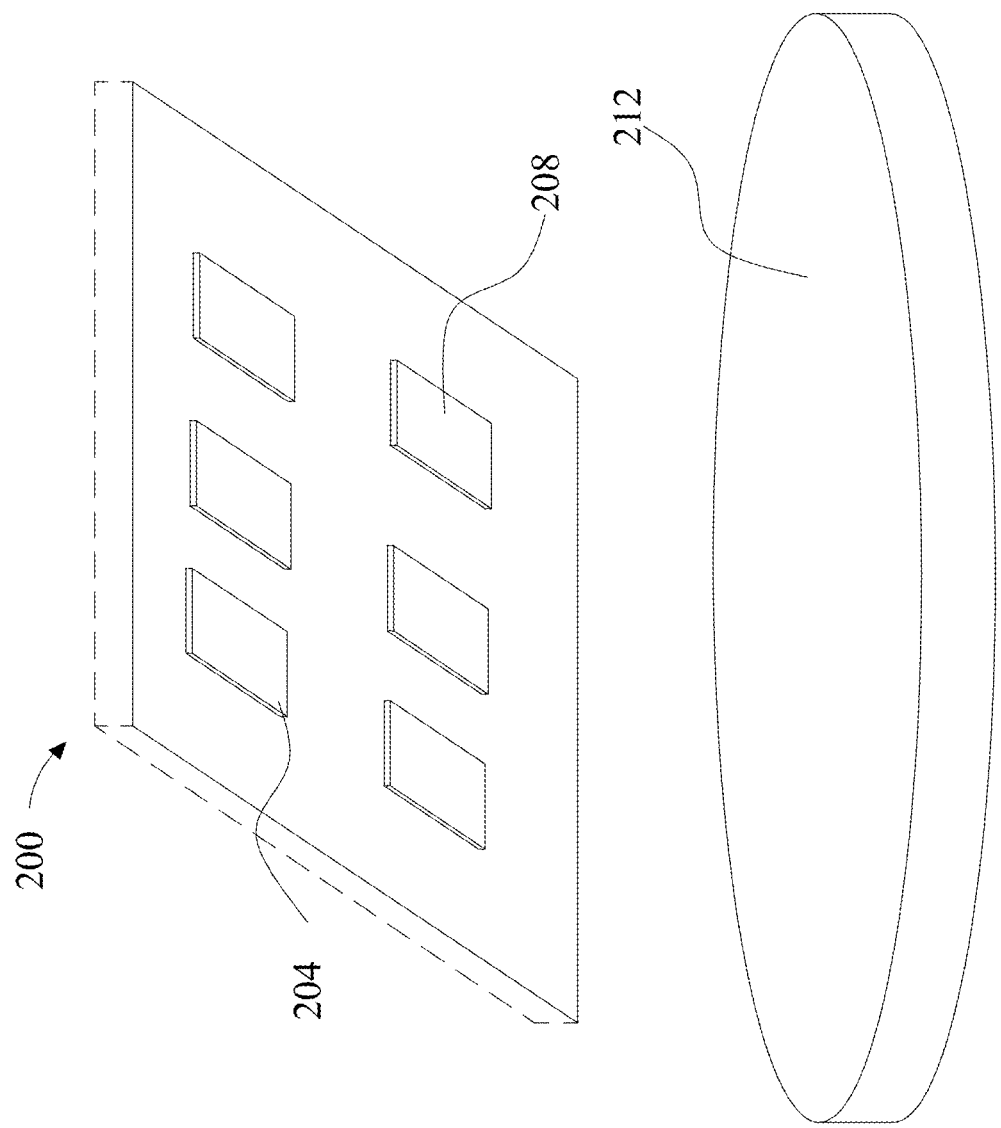
FIG. 2 is a front view of an exemplary embodiment of a sensor.

Referring now to FIG. 2, an embodiment of sensor 200 is presented. Embodiments may include a plurality of sensors in the form of individual sensors or a sensor working individually. A sensor may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 200 to detect phenomenon may be maintained. In a non-limiting example, a user may alter aircraft usage pursuant to sensor readings.

With continued reference to FIG. 2, sensor 200 may include a moisture sensor 204. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 204 may be psychrometer. Moisture sensor 204 may be a hygrometer. Moisture sensor 204 may be configured to act as or include a humidistat. A "humidistat", for the purposes of this disclosure, is a humidity-triggered switch, often used to control another electronic device. Moisture sensor 204 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 2, sensor 200 may include electrical sensors 208. Electrical sensors 208 may be configured to measure voltage across a component, electrical current through a component, and resistance of a component. Electrical sensors 508 may include separate sensors to measure each of the previously disclosed electrical characteristics such as voltmeter, ammeter, and ohmmeter, respectively. Sensor 200 may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor 200 and/or a control circuit incorporated therein and/or communicatively connected thereto may be configured to adjust charge to one or more battery cells as a function of a charge level and/or a detected parameter. For instance, and without limitation, sensor 200 may be configured to determine that a charge level of a battery cell is high based on a detected voltage level of that battery cell or portion of the battery pack. Sensor 200 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor 200 may include digital sensors, analog sensors, or a combination thereof. Sensor 200 may include digital-to-analog converters (DAC), analog-to-digital converters (ADC, A/D, A-to-D), a combination thereof, or other signal conditioning.

With continued reference to FIG. 2, sensor 200 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 200, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 2, sensor 200 may include a sensor configured to detect gas. Sensor 200 may be configured to detect combustible, flammable, toxic, oxygen depleted, a combination thereof, or another type of gas alone or in combination. The gas sensor that may be present in sensor 200 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination.

With continued reference to FIG. 2, sensor 200 may include a plurality of weather sensors. In some embodiments, sensor 200 may include a pressure sensor. Pressure, for the purposes of this disclosure, and as would be appreciated by someone of ordinary skill in the art, is a measure of force required to stop a fluid from expanding, and is usually stated in terms of force per unit area. The pressure sensor that may be included in sensor 200 may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

Still referring to FIG. 2, in some embodiments, sensor 200 may include an altimeter. The altimeter may be configured to measure an altitude. In some embodiments, the altimeter may include a pressure altimeter. In other embodiments, the altimeter may include a sonic, radar, and/or Global Positioning System (GPS) altimeter. Sensor 200 may include an anemometer. The anemometer may be configured to detect a wind speed. In some embodiments, the anemometer may include a hot wire, laser doppler, ultrasonic, and/or pressure anemometer. In some embodiments, the altimeter may be configured to detect an altitude of an electric aircraft. In some embodiments, sensor 200 may include a ceilometer. The ceilometer may be configured to detect and measure a cloud ceiling and cloud base of an atmosphere. In some embodiments, the ceilometer may include an optical drum and/or laser ceilometer. In some embodiments, sensor 200 may include a rain gauge. The rain gauge may be configured to measure precipitation. Precipitation may include rain, snow, hail, sleet, or other precipitation forms. In some embodiments, the rain gauge may include an optical, acoustic, or other rain gauge. In some embodiments, sensor 200 may include a pyranometer. The pyranometer may be configured to measure solar radiation. In some embodiments, the pyranometer may include a thermopile and/or photovoltaic pyranometer. The pyranometer may be configured to measure solar irradiance on a planar surface. In some embodiments, the pyranometer may be configured to measure solar radiation flux density from the hemisphere. In some embodiments, the pyranometer may be configured to measure solar irradiance within a wavelength range. In some embodiments, the wavelength range may be between 0.3 micrometers to 3 micrometers. In some embodiments, sensor 200 may include a lightning detector. The lightning detector may be configured to detect and measure lightning produced by thunderstorms. In some embodiments, sensor 200 may include a present weather sensor (PWS). The PWS may be configured to detect the presence of hydrometeors and determine their type and intensity. Hydrometeors may include a weather phenomenon and/or entity involving water and/or water vapor, such as, but not limited to, rain, snow, drizzle, hail and sleet. In some embodiments, sensor 200 may include an inertia measurement unit (IMU). The IMU may be configured to detect a change in specific force of a body.

Figure 3:
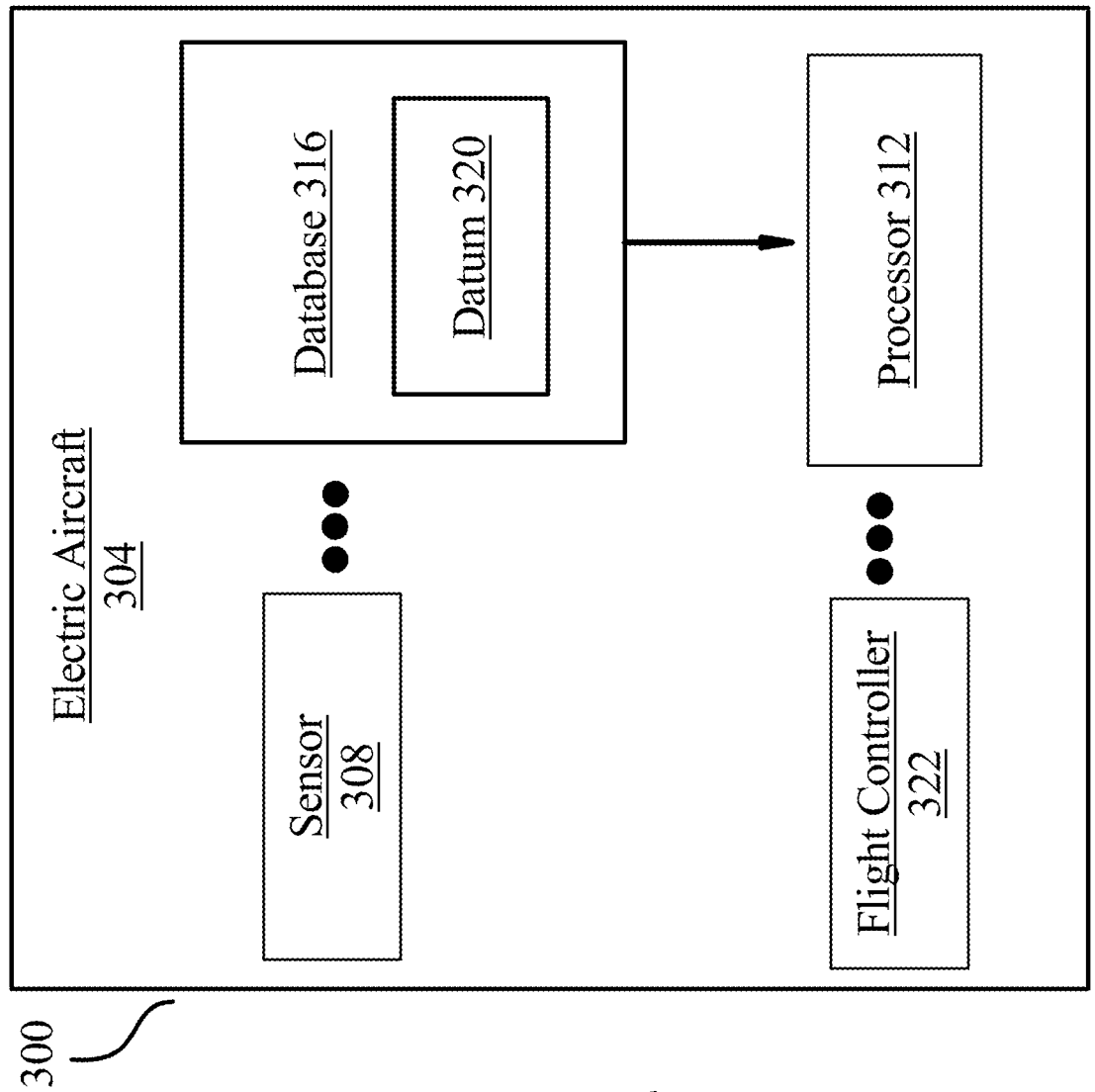
FIG. 3 is a front view of an exemplary embodiment of a block diagram of a system for flight trajectory planning of an electric aircraft.

Now referring to FIG. 3, an exemplary embodiment of a block diagram for a system 300 of a flight trajectory planning for an electric aircraft 304 is illustrated. In some embodiments, system 300 may include electric aircraft 304. Electric aircraft 304 may include an eVTOL. In other embodiments, electric aircraft 304 may include a drone. Electric aircraft 304 may include a sensor 308. Sensor 308 may be in communication with a flight controller 322. Sensor 308 may be in a communicative connection with flight controller 322. As used herein, "communicative connecting" is a process whereby one device, component, or circuit is able to receive data from and/or transmit data to another device, component, or circuit. In an embodiment, communicative connecting includes electrically coupling at least an output of one device, component, or circuit to at least an input of another device, component, or circuit. Sensor 308 may include a plurality of sensors that may be configured to measure, detect, and/or sense a change in an atmosphere. In some embodiments, sensor 308 may include one or more motion sensors, which may include any element suitable for use as an inertial measurement unit (IMU) or any component thereof, including without limitation one or more accelerometers, one or more gyroscopes, one or more magnetometers, or the like. Motion sensors may be selected to detect motion in three directions spanning three dimensions for instance, a set of three accelerometers may be configured or arranged to detect acceleration in three directions spanning three dimensions, such as three orthogonal directions, or three gyroscopes may be configured to detect changes in pitch spanning three dimensions, such as may be achieved by three mutually orthogonal gyroscopes. Sensor 308 may include one or more environmental sensors, including without limitation sensors for detecting wind, speed, temperature, or the like. In some embodiments, sensor 308 may include an altimeter. In some embodiments, sensor 308 may be configured to measure physical and/or electrical parameters, such as without limitation temperature and/or voltage, of electric aircraft 304. Sensor 308 and/or a control circuit incorporated therein and/or communicatively connected thereto, may further be configured to detect voltage and current of electric aircraft 304. Detection may be performed using any suitable component, set of components, and/or mechanism for direct or indirect measurement and/or detection of voltage levels, including without limitation comparators, analog to digital converters, any form of voltmeter, or the like.

With continued reference to FIG. 3, outputs from sensor 308 or any other component present within system 300 may be analog or digital. Onboard or remotely located processor 312 may convert those output signals from sensor to a usable form by the destination of those signals. The usable form of output signals from sensors, through processor may be either digital, analog, a combination thereof or an otherwise unstated form. Processing may be configured to trim, offset, or otherwise compensate the outputs of sensor. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

Still referring to FIG. 3, system 300 may include a database 316. In some embodiments, database 316 may be an on-board database within electric aircraft 304. In other embodiments, database 316 may be an exterior database that may be configured to communicate wirelessly with electric aircraft 304. Database 316 may be configured to receive a plurality of data from a user. In some embodiments, database 316 may be configured to receive a plurality of data from an external computing device. In some embodiments, database 316 may be configured to wirelessly receive data from an external computing device. In other embodiments, database 316 may be configured to receive data from an external computing device through a wired connection. The external computing device may include a computing device configured to send and receive data from electric aircraft 304 from the ground. In some embodiments, the external computing device may include a ground control station. In some embodiments, database 316 may include datum 320. Datum 320 may include any of a plurality of data including, but not limited to, weather data, altitude data, and destination data.

Weather data may include any data associated with atmospheric phenomena, such as pressure, humidity, temperature, wind speed, and wind direction. In some embodiments, the weather data that may be in datum 320 of database 316 may be provided from data gathered from sensor 308. In other embodiments, the weather data that may be in datum 320 of database 316 may be provided from an outside source. In some embodiments, datum 320 may include altitude data. Altitude data may include a desired altitude for a cruising level of electric aircraft 304. In other embodiments, altitude data may include data provided by sensor 308. In some embodiments, datum 320 may include destination data. Destination data may include a desired destination for a user of electric aircraft 304. In other embodiments, destination data may include a geographical location data for an endpoint of a trip of electric aircraft 304. In some embodiments, database 316 may be in communication with processor 312.

In some embodiments and still referring to FIG. 3, sensor 308 may be configured to detect a health status of electric aircraft 304. In some embodiments, health status of electric aircraft 304 may include a health datum of electric aircraft 304. In some embodiments, datum 320 may include the health datum of electric aircraft 304. In some embodiments, the health datum may include data of a status of a plurality of critical and non-critical functions of electric aircraft 304. In some embodiments, the health datum may include data about a failure of one or more flight components of electric aircraft 304. In some embodiments, the sensing and detection of the health of electric aircraft 304 may be as described in U.S. patent application Ser. No. 16/713,520, filed Dec. 13, 2019, titled "IN-FLIGHT STABILIZATION OF AN AIRCRAFT", which is incorporated by reference herein in its entirety.

In some embodiments and still referring to FIG. 3, sensor 308 may be configured to detect a health status of a battery pack of electric aircraft 304. In some embodiments, sensor 308 may be configured to detect and measure a voltage and/or current of a battery pack of electric aircraft 304. In some embodiments, sensor 308 may be configured to detect and measure a voltage and/or current of a plurality of battery cells of electric aircraft 304. In some embodiments, sensor 308 may be configured to detect a temperature of a battery pack of electric aircraft 304. Sensor 308 may provide database 316 with a health datum of a battery pack of electric aircraft 304. The health datum of the battery pack may include data of a temperature, voltage and/or current of the battery pack. In some embodiments, the sensing and monitoring of the health datum of the battery pack may be as described in U.S. patent application Ser. No. 17/241,396, filed Apr. 27, 2021, titled "SYSTEM AND METHOD FOR STATE DETERMINATION OF A BATTERY MODULE CONFIGURED FOR USED IN AN ELECTRIC VEHICLE", which is incorporated by reference herein in its entirety.

In some embodiments and still referring to FIG. 3, sensor 308 may be configured to detect a charge status of a battery pack of electric aircraft 304. In some embodiments, the charge status of the battery pack of electric aircraft 304 may include data of a capacity, voltage, power output, and current of the battery pack. In some embodiments, the data of the charge status of the battery pack of electric aircraft 304 may be communicated to database 316. Processor 312 may be configured to determine a remaining charge and/or power output of a battery pack of electric aircraft 304. In some embodiments, the detection and monitoring of charge status and remaining power of the battery pack of electric aircraft 304 may be as described in U.S. patent application Ser. No. 16/598,307, filed Oct. 10, 2019, titled "METHODS AND SYSTEMS FOR ALTERING POWER DURING FLIGHT", which is incorporated by reference herein its entirety.

Still referring to FIG. 3, processor 312 may be configured to interpret and process datum 320 from database 316. In some embodiments, processor 312 may be configured to determine an optimal trajectory of electric aircraft 304 based on a health status of electric aircraft 304. Processor 312 may be configured to determine an optimal trajectory of electric aircraft 304 based on a health status of a battery pack of electric aircraft 304. In some embodiments, processor 312 may be configured to determine an optimal trajectory of electric aircraft 304 based on a remaining charge status of a battery pack of electric aircraft 304. In some embodiments, processor 312 may be configured to solve at least an optimization problem, which may be an objective function. An "objective function," as used in this disclosure, is a mathematical function with a solution set including a plurality of data elements to be compared. Processor 312 may compute a score, metric, ranking, or the like, associated with each performance prognoses and candidate transfer apparatus and select objectives to minimize and/or maximize the score/rank, depending on whether an optimal result is represented, respectively, by a minimal and/or maximal score; an objective function may be used by processor 312 to score each possible pairing. At least an optimization problem may be based on one or more objectives, as described below. Processor 312 may pair a candidate transfer apparatus, with a given combination of performance prognoses, that optimizes the objective function. In various embodiments solving at least an optimization problem may be based on a combination of one or more factors. Each factor may be assigned a score based on predetermined variables. In some embodiments, the assigned scores may be weighted or unweighted.

With continued reference to FIG. 3, solving at least an optimization problem may include performing a greedy algorithm process, where optimization is performed by minimizing and/or maximizing an output of objective function. A "greedy algorithm" is defined as an algorithm that selects locally optimal choices, which may or may not generate a globally optimal solution. For instance, processor 312 may select objectives so that scores associated therewith are the best score for each goal. For instance, in non-limiting illustrative example, optimization may determine the altitude associated with a desired location based on an input.

Still referring to FIG. 3, the optimization problem may be formulated as a linear objective function, which processor 312 may optimize using a linear program such as without limitation a mixed-integer program. A "linear program," as used in this disclosure, is a program that optimizes a linear objective function, given at least a constraint; a linear program may be referred to without limitation as a "linear optimization" process and/or algorithm. For instance, in non-limiting illustrative examples, a given constraint might be battery charge, and a linear program may use a linear objective function to calculate maximum output based on the limit. In various embodiments, processor 312 may determine a set of instructions towards achieving a user's goal that maximizes a total score subject to a constraint that there are other competing objectives. A mathematical solver may be implemented to solve for the set of instructions that maximizes scores; mathematical solver may be implemented on processor 312. At least an optimization problem may be formulated as nonlinear least squares optimization process. A "nonlinear least squares optimization process,"

for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, processor 312 may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Still referring to FIG. 3, the optimization problem may include, but is not limited to, continuous optimization, bound constrained optimization, constrained optimization, derivative-free optimization, discrete optimization, global optimization, and/or nondifferentiable optimization. The optimization function may include minimizing a loss function, where a "loss function" is an expression an output of which an optimization algorithm minimizes to generate an optimal result. As a non-limiting example, processor 308 may assign variables relating to a set of parameters, which may correspond to score components as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. The optimization problem may include a plurality of parameters. The plurality of parameters may include, but is not limited to, weather datum, altitude datum, location datum, electric aircraft health datum, battery health datum, and battery charge datum. In some embodiments, the optimization problem may maximize one or more parameters. In some embodiments, the optimization problem may minimize one or more parameters. In some embodiments, the optimization problem may include one or more constraints that may be placed on one or more parameters. In a non-limiting example, a constraint may be placed on a battery charge datum parameter that may keep the battery charge of a battery pack of electric aircraft 304 within a range of charge status. In another non-limiting example, a constraint may be placed on an altitude datum parameter that may keep electric aircraft 304 within a certain range of altitude. In some embodiments, the optimization problem may minimize battery usage, travel time, wind resistance, and/or other parameters. In other embodiments, the optimization problem may maximize parameters such as, but not limited to, flight speed, altitude, electric aircraft health, and/or battery health.

With continued reference to FIG. 3, the optimization problem may predict an optimal trajectory based on minimization of a weather datum. In a non-limiting example, the optimization problem may predict an optimal trajectory that follows a path through benign weather, a path that avoids localized inclement weather such as thunderstorms, or the like. In such an example, other parameters may be at non-optimal values that may allow a path through an optimal weather scenario. In such an example, the other parameters may be optimized second to the minimization of the weather datum parameter. In some embodiments, one or more parameters may be weighted. The weight of the parameters may include an emphasis on certain parameters, such as, but not limited to, battery usage, flight time, and/or electric aircraft health. In other embodiments, other parameters may be weighted which may allow said parameters to more heavily influence the optimization problem and optimal trajectory.

Still referring to FIG. 3, in some embodiments, processor 312 may include an artificial intelligence configured to process datum 320 from database 316. In some embodiments, processor 312 may include a machine learning model configured to process datum 320 from database 316. Processor 316 may be configured to output an optimal flight trajectory to flight controller 322 for electric aircraft 304. The optimal flight trajectory may include a flight plan to reduce travel time, reduce fuel usage, improve quality of travel and avoid damage to electric aircraft 304. The optimal flight trajectory may include a function of aerodynamics and propulsion systems of electric aircraft 304. Processor 312 may be in communication with flight controller 322. In some embodiments, processor 312 may be configured to transmit data to flight controller 322. In some embodiments, the data may include a flight plan, flight commands, flight alerts, and/or environmental data. In some embodiments, flight controller 322 may be in communication with sensor 308. Sensor 308 may provide real time weather phenomenon data to flight controller 322. Flight controller 322 may update flight controls, plans, and projected trajectory of electric aircraft 304 based on data from sensor 308. In some embodiments, flight controller 322 may update flight controls, plans, and projected trajectory of electric aircraft 304 based on an outside input such as an administrative user.

In some embodiments, and with continued reference to FIG. 3, processor 312 may be configured to determine one or more sequences in an optimal trajectory of electric aircraft 304. The one or more sequences may include, but are not limited to, a takeoff stage, a cruising stage, and a landing stage. Processor 312 may utilize an optimization problem to determine an optimal takeoff sequence. In some embodiments, an optimal takeoff sequence may include a plurality of parameters. The plurality of parameters of the optimal takeoff sequence may include, but is not limited to, power output, takeoff speed, vertical propulsor activity, thrust propulsor activity, and weather datum. Processor 312 may utilize an optimization problem to determine an optimal cruising stage. An optimal cruising stage may include a transition from a takeoff stage to a cruising stage. In some embodiments, an optimal cruising stage may include a plurality of parameters. The plurality of parameters of the optimal cruising stage may include, but is not limited to, altitude, speed, weather, battery charge, battery health, wind speed, and electric aircraft health. In some embodiments, processor 312 may utilize an optimization problem to determine an optimal transition from a takeoff stage to a cruising stage. In some embodiments, processor 312 may utilize an optimization problem to determine an optimal landing stage. An optimal landing stage may include a transition from a cruising stage to a landing stage. In some embodiments, an optimal landing stage may include a plurality of parameters. The plurality of parameters of the optimal landing stage may include, but is not limited to, power output, landing speed, electric aircraft health, weather, vertical propulsor activity, thrust propulsor activity, and battery health. An optimal landing stage may include an optimal power output of a battery pack of electric aircraft 304.

With continued reference to FIG. 3, processor 312 may utilize a machine learning model that may predict and/or determine an optimal trajectory of electric aircraft 304. The machine learning model may be trained on a plurality of parameters, such as, but not limited to, weather data, altitude data, location data, battery charge data, battery health data, and electric aircraft health data. The machine learning model may be trained on a sequence of events that may take place in an optimal trajectory such as, but not limited to, a takeoff stage, a cruising stage, and a landing stage. The machine learning model may be trained to prioritize one or more parameters in a plurality of parameters. In one embodiment, the machine learning model may prioritize battery charge. In another embodiment, the machine learning model may prioritize travel time. In some embodiments, the machine learning model may be trained with constraints on parameters. In some embodiments, the machine learning model may be trained with weighted parameters.

In some embodiments, and still referring to FIG. 3, processor 312 may be positioned in an external computing system. In some embodiments, the external computing system may receive data from sensor 308 and database 316. In some embodiments, the external computing system may determine an optimal trajectory of electric aircraft 304. The external computing system may send an optimal trajectory to electric aircraft 304. In some embodiments, the external computing system may send an optimal trajectory to electric aircraft 304 wirelessly.

Figure 4:
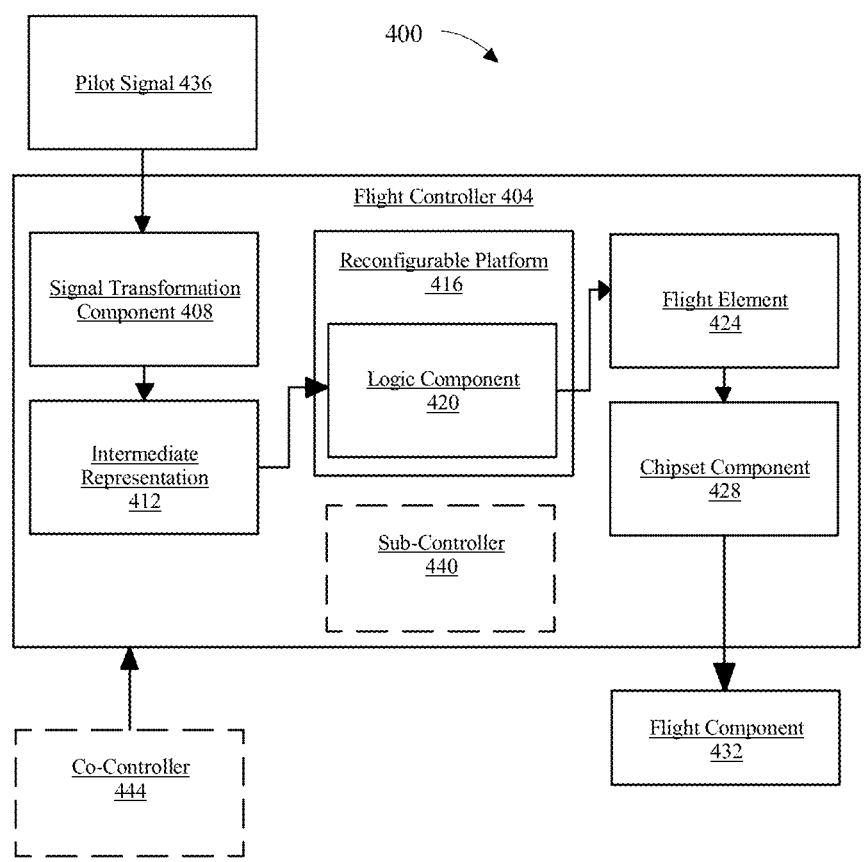
FIG. 4 is a block diagram of an exemplary embodiment of a flight controller system.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal.

In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

Still referring to FIG. 4, in an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
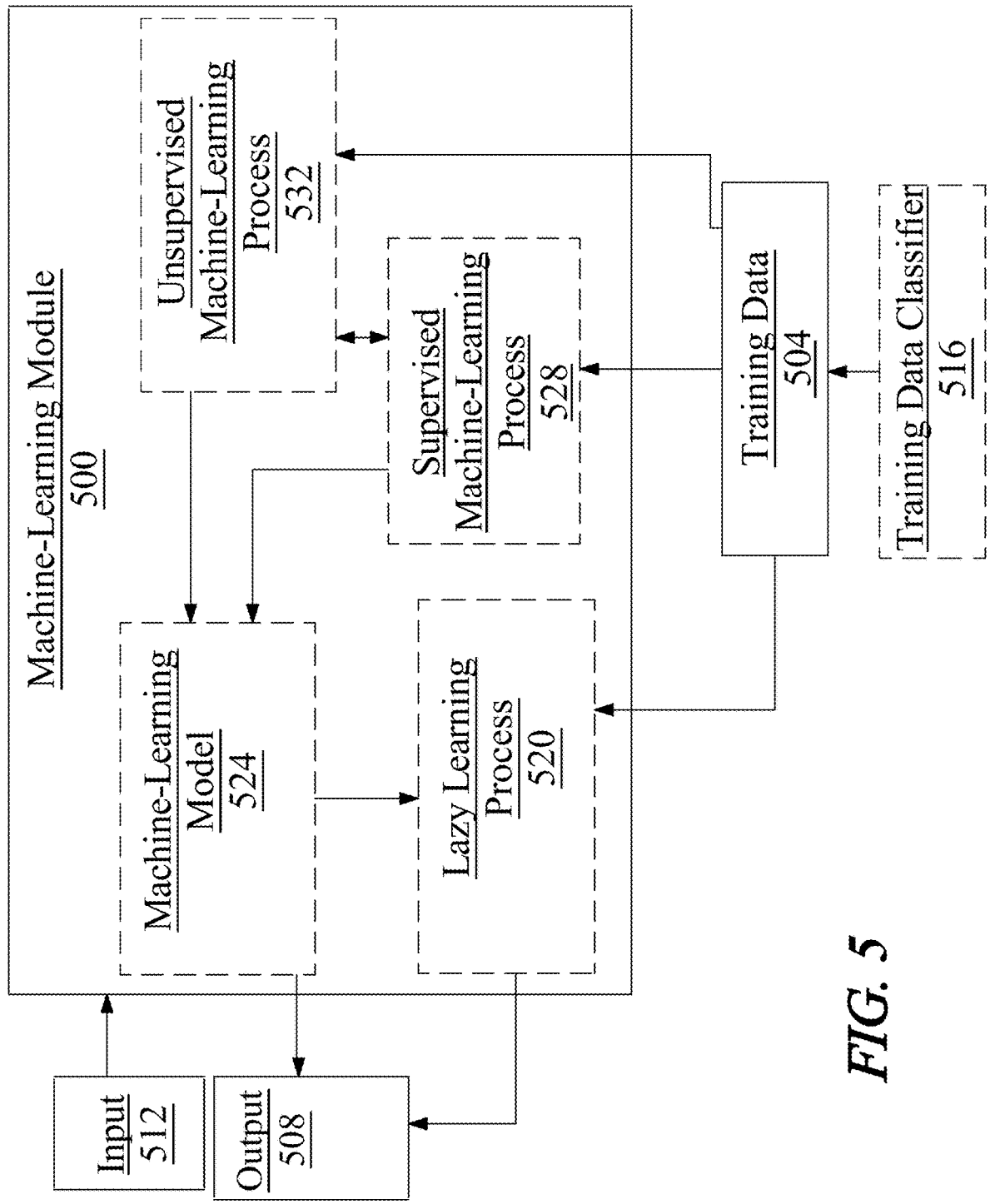
FIG. 5 is an exemplary embodiment of a machine learning system.

Referring now to FIG. 5, an exemplary embodiment of a machine-learning module 500 that may perform one or more machine-learning processes as described in this disclosure is illustrated. Machine-learning module 500 may be implemented in the determination of the flight states of the electric aircraft. Machine-learning module 500 may communicated with the flight controller to determine a minimal drag axis for the electric aircraft. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear problem may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial problem (e.g. a quadratic, cubic or higher-order problem) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
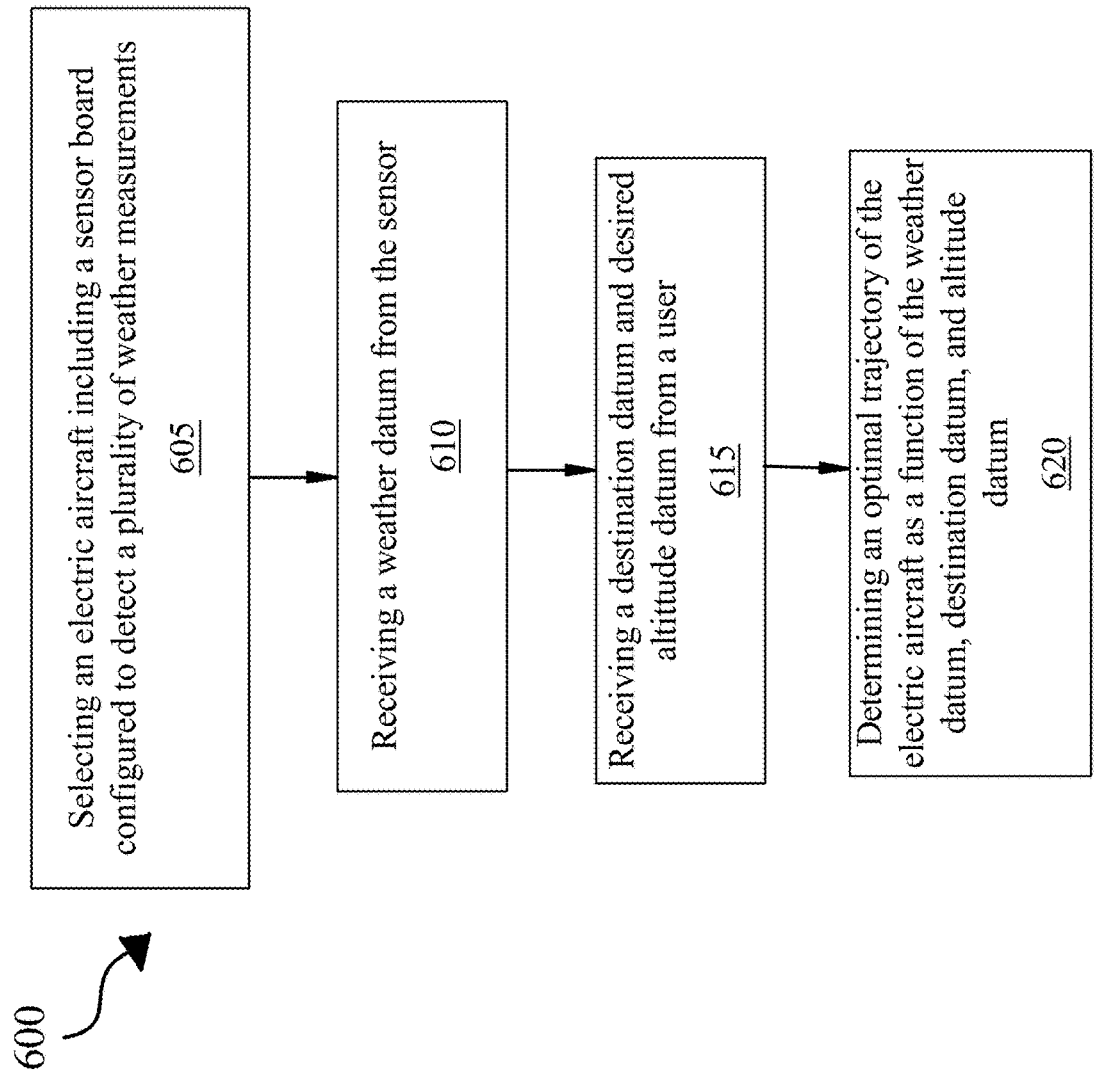
FIG. 6 is a flowchart of an exemplary embodiment of a method for flight trajectory planning of an electric aircraft.

Now referring to FIG. 6, a method 600 for flight trajectory planning of an electric aircraft is illustrated. At step 605, an electric aircraft including a sensor configured to detect a plurality of weather measurements is selected. In some embodiments, the electric aircraft may include an eVTOL. In some embodiments, the sensor may be configured to detect pressure, temperature, humidity, wind speed, and precipitation. In some embodiments, the sensor may include multiple sensors. In some embodiments, the sensor may be electrically coupled to the electric aircraft. In some embodiments, the sensor may be configured to detect weather phenomenon in an immediate surrounding of the electric aircraft. In some embodiments, the sensor may be configured to relay data to the electric aircraft in real-time.

Referring to FIG. 6, at step 610, a weather datum is received from the sensor. The weather datum may include data about weather phenomenon measured from the sensor. The weather datum may include data about humidity, pressure, temperature, wind speed, and precipitation. The weather datum may include data about visibility. In some embodiments, the weather datum may include data about cloud height.

Still referring to FIG. 6, at step 615, a destination datum and desired altitude datum is received from a user. The destination datum may include geographical data. In some embodiments, the destination datum may be received from a user computing device. In some embodiments, the destination datum may include a final destination of a flight path for the electric aircraft. In some embodiments, the destination datum may include a point between a departure location and a final destination. In some embodiments, the destination datum may include multiple geographical coordinates from a plurality of users. In some embodiments, the destination datum may include a history of destinations traveled to. In some embodiments, the destination datum may include a destination for recharging the electric aircraft. In other embodiments, the destination datum may include a destination for a resting point. The altitude datum may include an altitude of an electric aircraft. In some embodiments, the altitude datum may include an altitude of a cruising speed of the electric aircraft. In some embodiments, the altitude datum may include a range of altitudes for the electric aircraft. In some embodiments, the altitude datum may include a history of altitudes received from a plurality of users.

With continued reference to FIG. 6, at step 620, an optimal trajectory as a function of the weather datum, destination datum, and altitude datum is determined. In some embodiments, the optimal trajectory may be determined by utilizing an optimization problem. The optimal trajectory may include a flight path for the electric aircraft that may avoid inclement weather. The optimal trajectory may include a trajectory that may avoid heavy wind. In some embodiments, the optimal trajectory may include a fuel efficient flight path. In some embodiments, the optimal trajectory may include a flight path for the electric aircraft that may include a proposed altitude within a range of the user inputted altitude. In some embodiments, the optimal trajectory may include a function of the aerodynamics and propulsion system of the electric aircraft. In some embodiments, the optimal trajectory may include a trajectory that may allow the propulsion system of the electric aircraft to run at an optimal power consumption. In some embodiments, the optimal trajectory may include a trajectory that may allow the propulsion system to move the electric aircraft at an optimal speed. In some embodiments, the optimal trajectory may include an optimal speed of the electric aircraft. In some embodiments, the optimal trajectory may include a real time calculation based on real time input from the sensor. In some embodiments, the optimal trajectory may be calculated by using artificial intelligence and/or machine learning models.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
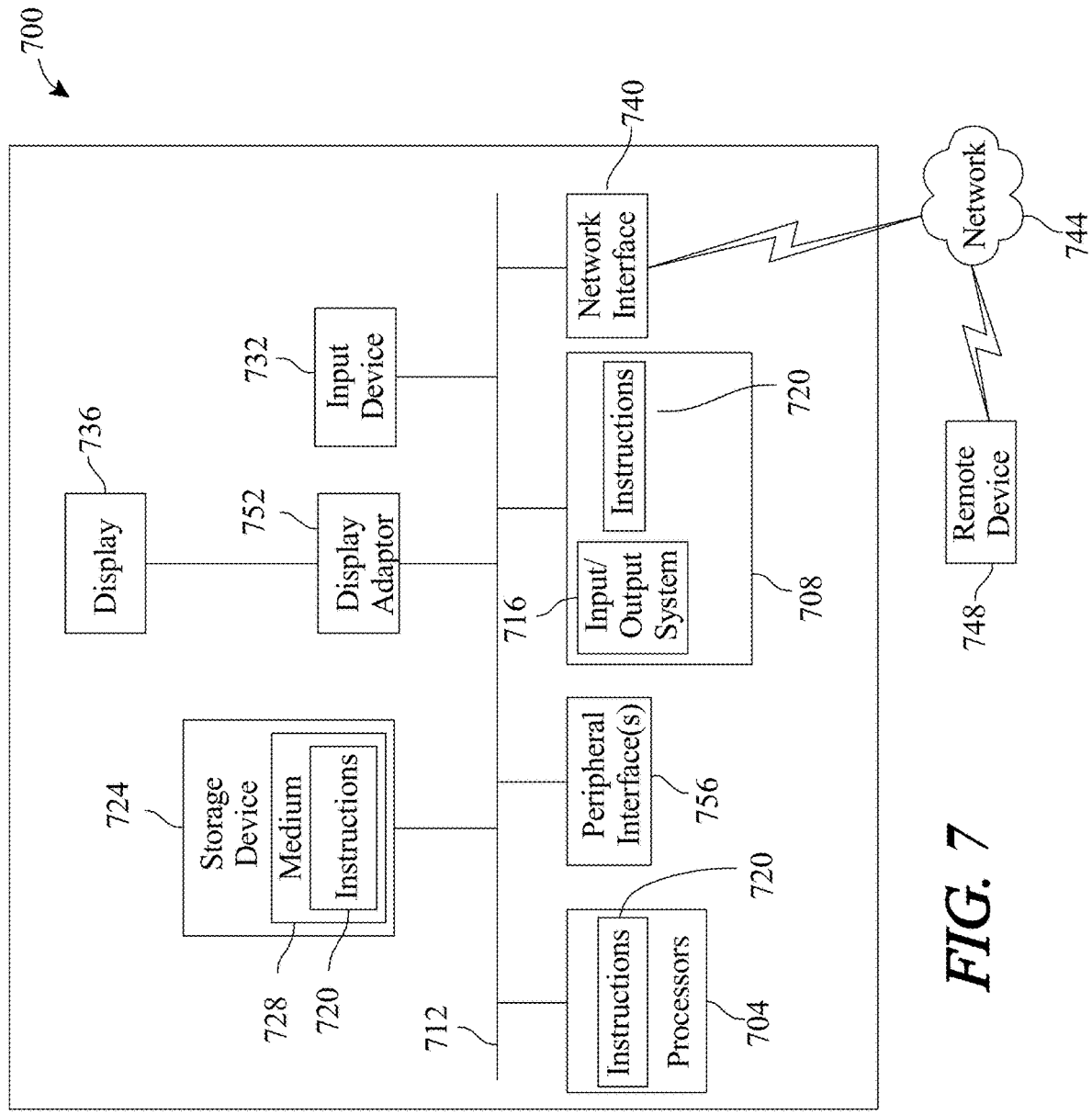
FIG. 7 is a block diagram of an exemplary embodiment of a computing system.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Still referring to FIG. 7, processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

With continued reference to FIG. 7, memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Still referring to FIG. 7, computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Referring to FIG. 7, computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

Still referring to FIG. 7, a user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

With continued reference to FIG. 7, computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric aircraft with flight trajectory planning, the electric aircraft comprising:
   a sensor coupled to the electric aircraft, wherein the sensor is configured to detect a plurality of weather measurements; and
   a processor communicatively connected to the sensor, wherein the processor is configured to:
   receive, from the sensor, a weather measurement of the plurality of weather measurements;
   receive, from a user, a destination datum; and
   determine an optimal trajectory of the electric aircraft as a function of the destination datum and weather datum.

2. The electric aircraft of claim 1, wherein determining the optimal trajectory further comprises:
   determining the optimal trajectory of the electric aircraft as a function of the destination datum, and the weather datum.

3. The electric aircraft of claim 1, wherein the determining the optimal trajectory further comprises determining an optimal landing stage.

4. The electric aircraft of claim 1, wherein the determining the optimal trajectory further comprises determining an optimal takeoff stage.

5. The electric aircraft of claim 1, wherein the determining the optimal trajectory further comprises solving an optimization problem as a function of a plurality of parameters.

6. The electric aircraft of claim 5, wherein the plurality of parameters includes weather, battery charge, battery health, and wind speed.

7. The electric aircraft of claim 5, wherein solving the optimization problem further comprises optimizing an objective function of the plurality of parameters.

8. The electric aircraft of claim 1, wherein the processor determines an optimal trajectory of the electric aircraft based on a health datum of the electric aircraft.

9. The electric aircraft of claim 1, wherein the processor determines an optimal trajectory of the electric aircraft as a function of a set of aerodynamics and a propulsion system of the electric aircraft.

10. The electric aircraft of claim 1, wherein the processor determines an optimal trajectory of the electric aircraft based on a fuel efficiency of the electric aircraft.

11. A method for flight trajectory planning of an electric aircraft, the method comprising:
    detecting, using a sensor coupled to the electric aircraft, a plurality of weather measurements;
    receiving, by a processor and from the sensor, a weather measurement of the plurality of weather measurements;
    receiving, by the processor and from a user, a destination datum and a desired altitude datum; and
    determining, by the processor, an optimal trajectory of the electric aircraft as a function of the destination datum and weather datum.

12. The method of claim 11, wherein determining the optimal trajectory further comprises:
    determining the optimal trajectory of the electric aircraft as a function of the destination datum, and the weather datum.

13. The method of claim 11, wherein the determining the optimal trajectory further comprises determining an optimal landing stage.

14. The method of claim 11, wherein the determining the optimal trajectory further comprises determining an optimal takeoff stage.

15. The method of claim 11, wherein the determining the optimal trajectory further comprises solving an optimization problem as a function of a plurality of parameters.

16. The method of claim 15, wherein the plurality of parameters includes weather, battery charge, battery health, and wind speed.

17. The method of claim 15, wherein solving the optimization problem further comprises optimizing an objective function of the plurality of parameters.

18. The method of claim 11, wherein determining an optimal trajectory includes a minimization problem.

19. The method of claim 11, wherein determining an optimal trajectory includes a maximization problem.

20. The method of claim 11, wherein the weather datum includes precipitation data.

* * * * *